United States Patent
Iwakura

(10) Patent No.: US 6,766,015 B1
(45) Date of Patent: Jul. 20, 2004

(54) METHOD AND DEVICE FOR HUNTING FOR COMMUNICATION CHANNEL

(75) Inventor: Hirokazu Iwakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,667

(22) Filed: Mar. 15, 2000

(30) Foreign Application Priority Data

Jun. 23, 1999  (JP) ............................................ 11-177173

(51) Int. Cl.7 ............................................. H04M 3/00
(52) U.S. Cl. ...................... 379/272; 379/273; 379/274; 379/275; 379/276
(58) Field of Search ........................... 379/112.08, 242, 379/246, 272, 273, 270, 275, 293, 333, 337, 138, 156, 232, 240, 241, 133, 274, 276

(56) References Cited

U.S. PATENT DOCUMENTS

| | | | | |
|---|---|---|---|---|
| 5,040,173 A | * | 8/1991 | Richards | 370/351 |
| 5,590,176 A | * | 12/1996 | Agarwal et al. | 379/221.01 |
| 5,680,392 A | * | 10/1997 | Semaan | 370/261 |
| 5,802,058 A | * | 9/1998 | Harris et al. | 370/410 |
| 6,034,956 A | * | 3/2000 | Olnowich et al. | 370/388 |
| 6,330,329 B1 | * | 12/2001 | Kovarik | 379/333 |
| 6,483,912 B1 | * | 11/2002 | Kalmanek et al. | 379/219 |
| 6,490,347 B2 | * | 12/2002 | DeCaluwe et al. | 379/221.01 |
| 6,519,337 B1 | * | 2/2003 | Koo et al. | 379/333 |

FOREIGN PATENT DOCUMENTS

JP          8-289006          11/1996

* cited by examiner

Primary Examiner—Bing Bui
(74) Attorney, Agent, or Firm—Katten Muchin Zavis Rosenman

(57) ABSTRACT

A method of hunting for a communication channel in a communication system where a plurality of communication lines each have a plurality of communication channels includes the steps of maintaining a record of current channel statuses of the communication channels with respect to all the communication lines, and distributing busy channels evenly among the communication lines by selecting a communication channel based on the record of channel statuses and assigning the selected communication channel to a call.

11 Claims, 12 Drawing Sheets

METHOD AND DEVICE FOR HUNTING FOR COMMUNICATION CHANNEL

BACKGROUND OF THE INVENTION

1. Field of the Invention

The present invention generally relates to a method of hunting for a communication channel and a device operating based on the method, and particularly relates to a method of hunting for a communication channel and a device operating based on the method where the method hunts for a PCM communication channel in a communication system comprised of a plurality of PCM communication lines.

2. Description of the Related Art

FIG. 1 is an illustrative drawing showing a network access device and a switch in a communication system. FIG. 2 is an illustrative drawing showing two switches in a communication system.

In FIG. 1 and FIG. 2, a switch 10 includes PCM-communication-line control devices 11, a network switch 12, subscriber circuits 13, a signal processing device 15, a central controller 16, a main memory 17, and a bus 18.

In FIG. 1, each of the PCM-communication-line control devices 11 is connected to a network access device 21 via a PCM communication line 20. In FIG. 2, each of the PCM-communication-line control devices 11 is connected to another switch 22. The subscriber circuits 13 are directly connected to subscriber terminals 14. Each PCM communication line 20 has a capacity for 30 different communication channels, for example. In the configuration of FIG. 1, the network access device 21 transmits a call-transmission signal or a call-disconnection signal to the switch 10 via a PCM communication line 20 when such a signal is received from a subscriber terminal connected to the network access device 21. The switch 10 attends to control of the call.

Under the control of the central controller 16, the network switch 12 switches communication lines. The signal processing device 15 receives a call-transmission signal or a call-disconnection signal from a subscriber terminal 14 or from the network access device 21, and searches for or hunts for an available channel in a PCM communication line 20. If a channel is available, the signal processing device 15 allocates the channel to the communication channel of a subscriber who initiated the call. If all the channels are busy in a given PCM communication line 20, a search is conducted with respect to another PCM communication line 20. Then, an available channel that is found is allocated to the communication channel of the subscriber who initiated the call.

When a subscriber initiates a call, there may be a communication channel in a PCM communication line 20 where the communication channel was selected on a previous occasion in response to the subscriber's previous call. In such a case, a search for an available channel is started from a channel next following the previously selected communication channel in this PCM communication line 20. If an available channel is found, the signal processing device 15 allocates the channel to the communication channel of the subscriber who initiated the call. If all the channels are busy in a given PCM communication line 20, a search is conducted with respect to another PCM communication line 20. Then, an available channel that is found is allocated to the communication channel of a subscriber who initiated the call.

For the purpose of hunting for a channel in an environment where a plurality of PCM communication lines are provided, typically, channel statuses as to whether the channels are available are controlled separately for each PCM communication line. When a subscriber initiates a call, a search for an available channel is conducted in a PCM communication line. If an available channel is found, the channel is allocated to the communication channel of the subscriber who initiated the call. If all the channels are busy in this PCM communication line, a search is conducted in another PCM communication line. When an available channel is found, the channel is allocated to the communication channel of a subscriber who initiated the call. Alternately, an initial search for an available channel may be started from a channel next following a previously selected channel that was chosen for a previous call.

In such a channel hunt method as described above, a channel of a second PCM communication line is allocated in response to a call when all the channels of the first PCM communication line are busy or all the channels next following the previously selected channel in the first PCM communication line are busy. Because of this, a PCM communication line which is currently allocated to calling subscribers tends to have more busy channels than other PCM communication lines. If this PCM communication line suffers failure, many numbers of calls are terminated.

Further, when a PCM communication line is to be shut down for the maintenance purpose, shutting down is not performed until all the channels become non-busy. It takes time to shut down a PCM communication line that is allocated to calling subscribers since such a line has a larger number of busy channels than other lines.

Accordingly, there is a need for a channel hunt method and a device based on such a method which can reduce the number of calls to be terminated at the time of failure of a PCM communication line, and can shorten a time period required for shutting down a PCM communication line.

SUMMARY OF THE INVENTION

Accordingly, it is a general object of the present invention to provide a channel hunt method and a device based on such a method which can satisfy the need described above.

It is another and more specific object of the present invention to provide a channel hunt method and a device based on such a method which can reduce the number of calls to be terminated at the time of failure of a PCM communication line, and can shorten a time period required for shutting down a PCM communication line.

In order to achieve the above objects according to the present invention, a method of hunting for a communication channel in a communication system where a plurality of communication lines each have a plurality of communication channels includes the steps of maintaining a record of current channel statuses of the communication channels with respect to all the communication lines, and distributing busy channels evenly among the communication lines by selecting a communication channel based on the record of channel statuses and assigning the selected communication channel to a call.

The method as described above distributes busy channels evenly among the communication lines, so that concentration of busy channels in a particular communication line can be avoided. This reduces the number of calls that are to be terminated at a time of communication-line failure, and shortens a time period required for closing a communication line.

In order to distribute busy channels evenly among the communication lines, according to one aspect of the present invention, the communication channels have channel numbers assigned thereto, and the communication lines have line numbers assigned thereto, wherein the step of distributing the busy channels includes the steps of searching through the record for an available channel having a search channel number by checking the communication lines in an ascending order of the line numbers, repeating the search by successively incrementing the search channel number from a smallest channel number to a largest channel number until the available channel is found, and assigning the available channel to the call.

According to the present invention, there are at least three other variations of the communication-channel-hunt method that achieves even distribution of busy lines. These three variations and the particular variation that was described above may be provided as one set, and a selection may be made among the four variations to perform a search of a desired type to look for a communication channel in a desired manner.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
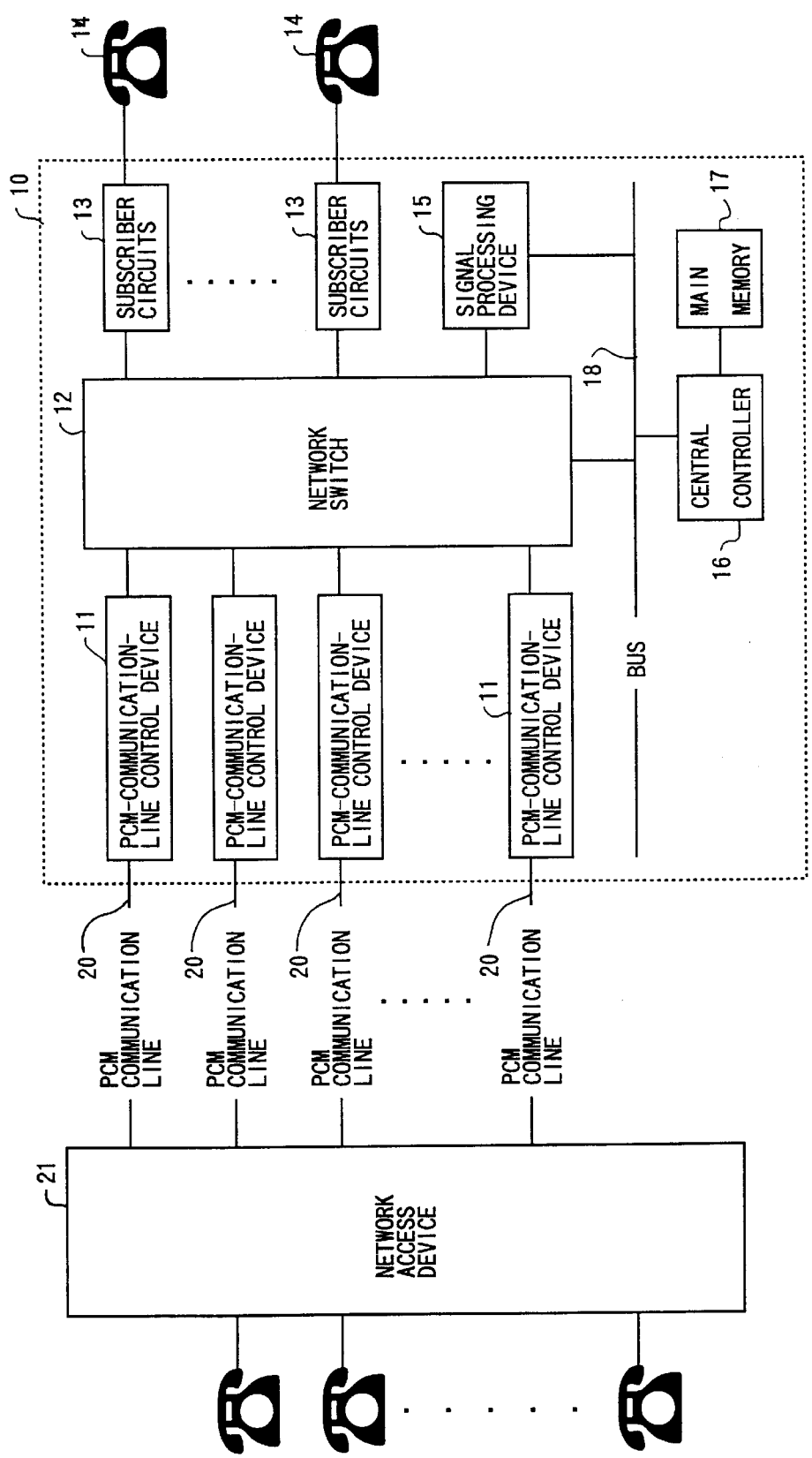
FIG. 1 is an illustrative drawing showing a network access device and a switch in a communication system.
Figure 2:
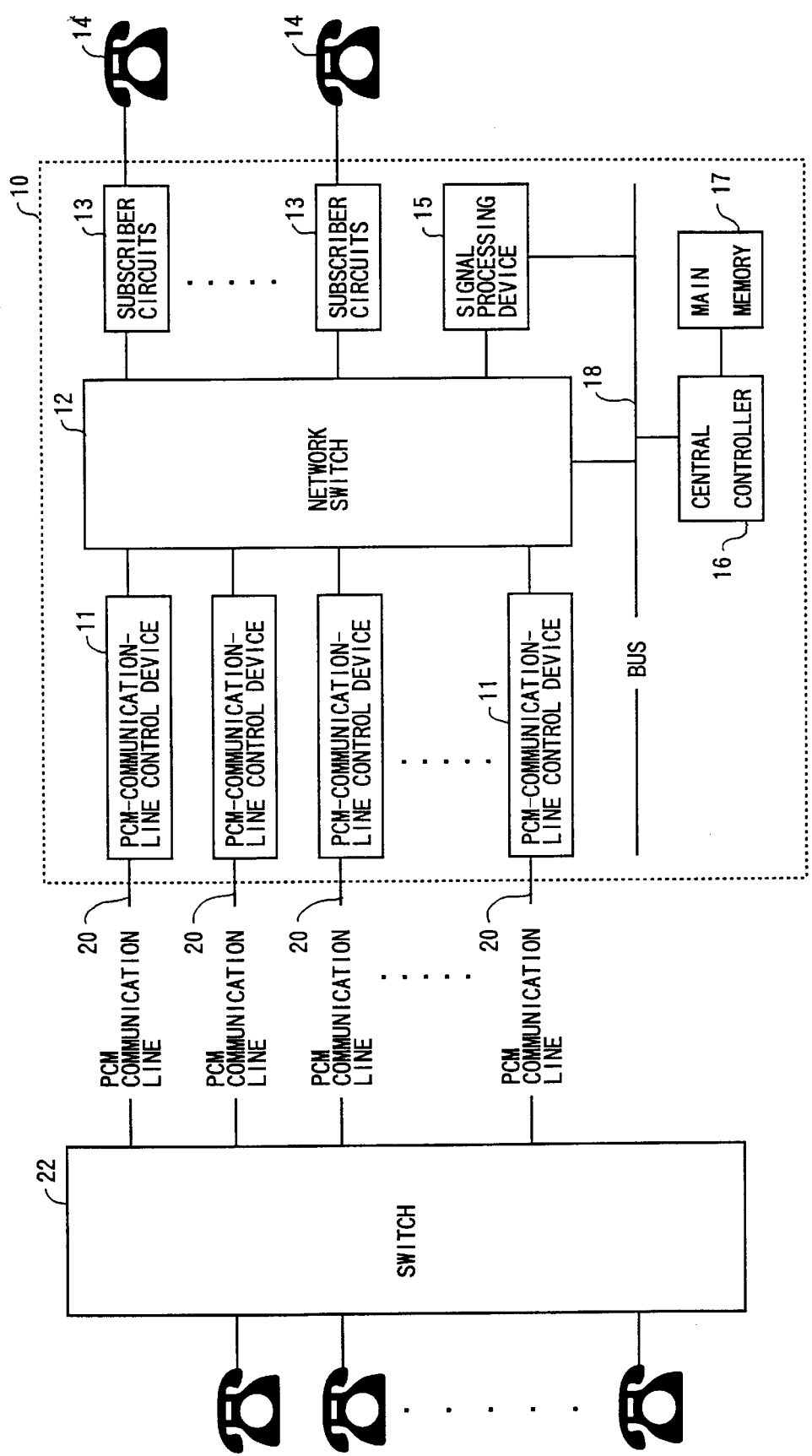
FIG. 2 is an illustrative drawing showing two switches in a communication system.
Figure 3:
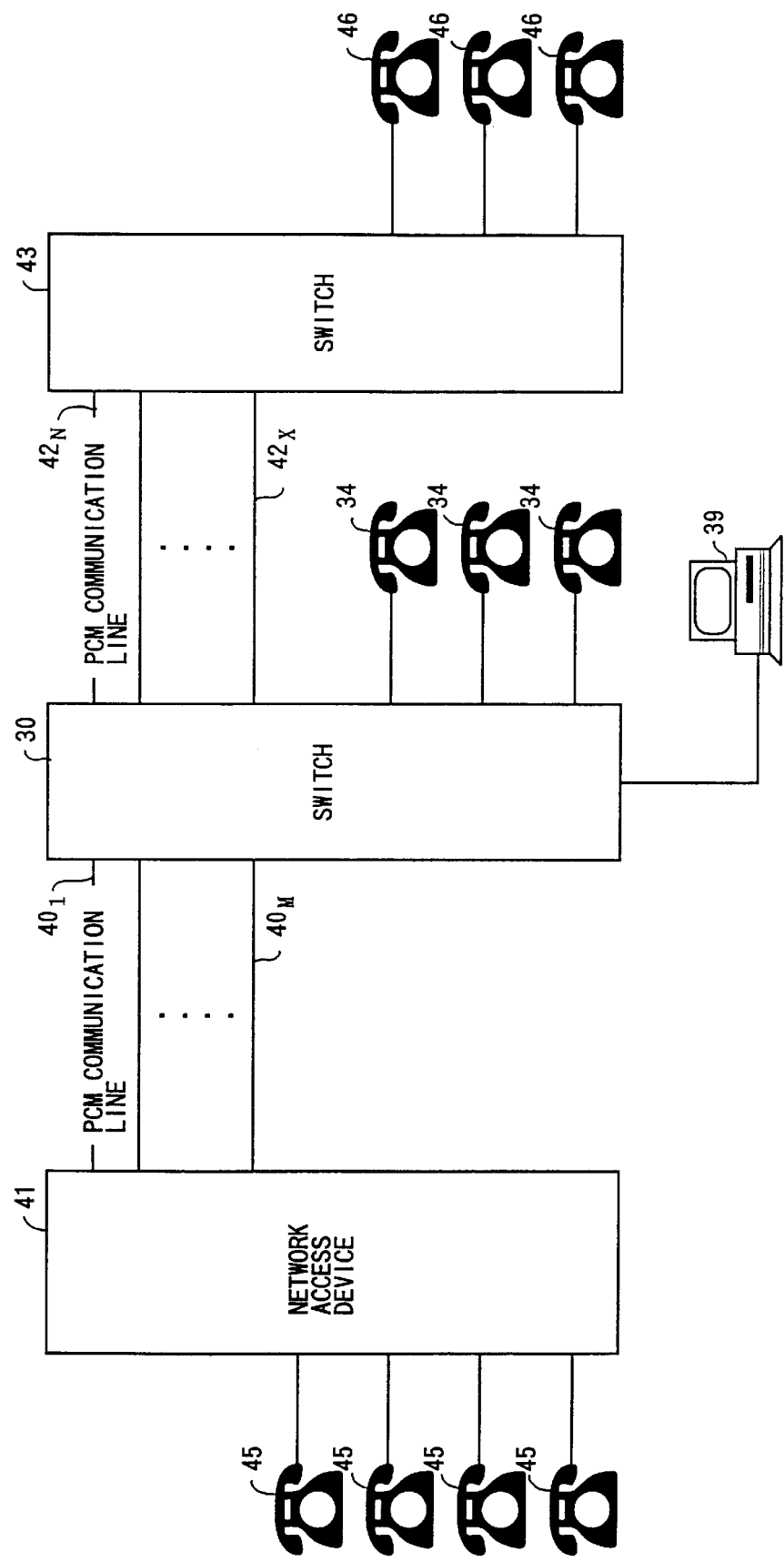
FIG. 3 is an illustrative drawing showing a configuration of a communication system to which the present invention is applied.

FIG. 3 is an illustrative drawing showing a configuration of a communication system to which the present invention is applied.

In FIG. 3, a switch 30 is connected to a network access device 41 via PCM communication lines $40_1$ through $40_M$, and, also, is connected to another switch 43 via PCM communication lines $42_N$ through $42_X$. The switch 30 has a plurality of subscriber terminals 34 directly connected thereto. The network access device 41 also has a plurality of subscriber terminals 45 directly connected thereto. Further, the switch 43 is directly connected to subscriber terminals 46. An input/output device 39 is provided for the switch 30.

Each of the PCM communication lines $40_1$ through $40_M$ and the PCM communication lines $42_N$ through $42_X$ has 30 communication channels, for example. The network access device 41 sends a call-transmission signal or a call-disconnection signal to the switch 30 via a PCM communication line when receiving such a signal from one of the subscriber terminals 45 connected to the network access device 41. The switch 30 attends to control of the call.

Figure 4:
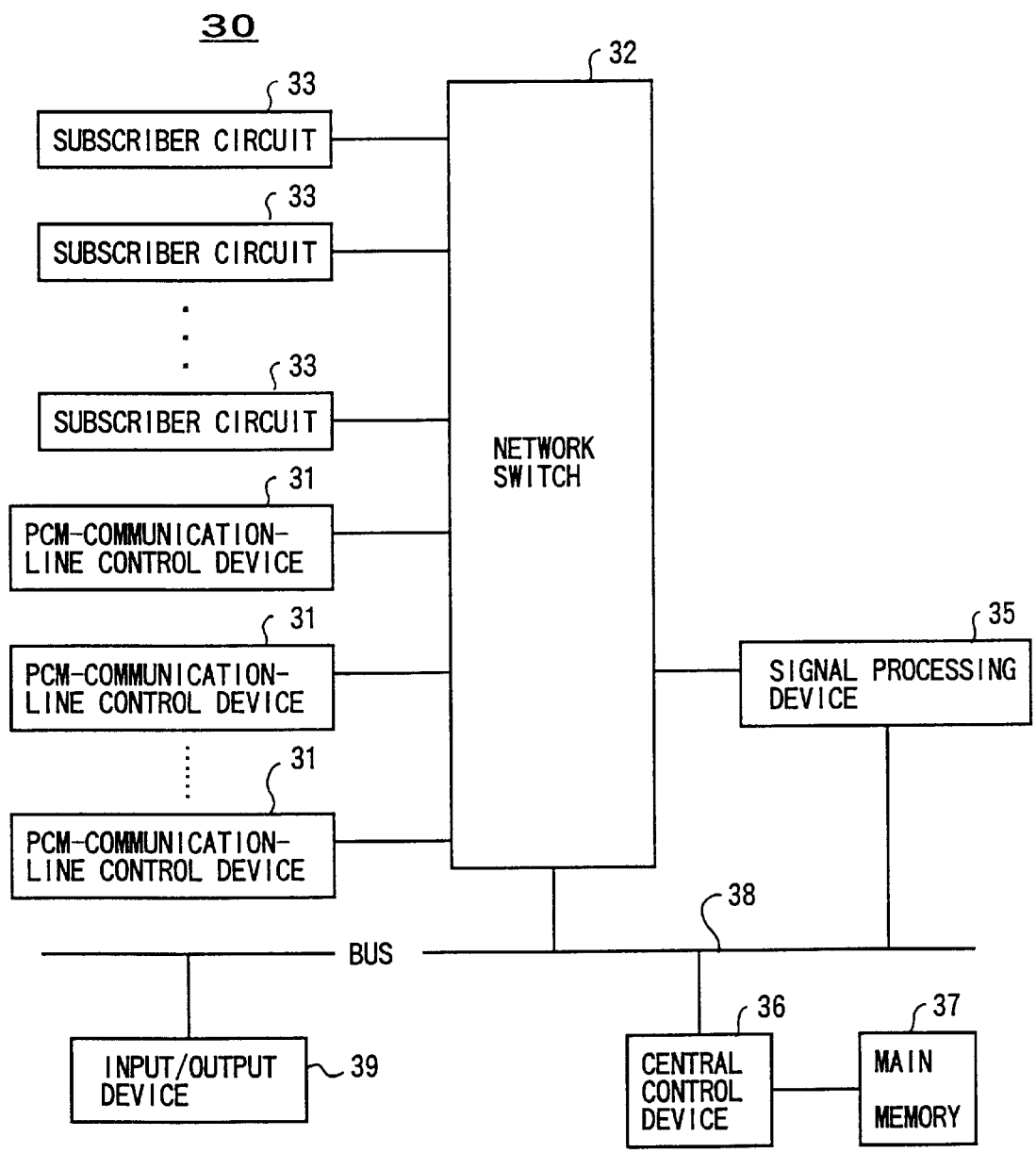
FIG. 4 is a block diagram of a switch according to an embodiment of the present invention.

FIG. 4 is a block diagram of a switch according to an embodiment of the present invention.

The switch 30 of FIG. 4 includes PCM-communication-line control devices 31, a network switch 32, subscriber circuits 33, a signal processing device 35, a central control device 36, a main memory 37, and a bus 38.

Each of the PCM-communication-line control devices 31 is connected to the network access device 41 and the switch 43 via the PCM communication lines $40_1$ through $40_M$ and the PCM communication lines $42_N$ through $42_X$, respectively. The subscriber circuits 33 are directly connected to the subscriber terminals 34. The network switch 32 operates under the control of the central control device 36 to attend to switching of lines. The main memory 37 stores therein control programs for the central control device 36 and switch control information for the network switch 32.

When one of the subscriber terminals 34 transmits a call or disconnects a call or when a call-transmission signal or a call-disconnection signal is received from one of the subscriber terminals 45 via the network access device 41, the signal processing device 35 searches for an available channel as will be described later in detail. The signal processing device 35 allocates an obtained available channel to the communication channel of a subscriber who transmitted the call. The input/output device 39 provides a means of input/output control between the switch 30 and a maintenance worker. The switch 43 has basically the same configuration as the switch 30.

The network switch 32 attends to line switching under the control of the central control device 36. The signal processing device 35 receives a call-transmission signal or a call-disconnection signal from a subscriber terminal 34 or from the network access device 41, and searches for or hunts for an available channel in any given PCM communication line. If a channel is available, the signal processing device 35 allocates the channel to the communication channel of a subscriber who initiated the call. If all the channels are busy in the given PCM communication line, a search is conducted with respect to another PCM communication line. Then, an available channel that is found is allocated to the communication channel of the subscriber who transmitted the call.

In the present invention, data tables are stored in the main memory 37.

Figure 5:
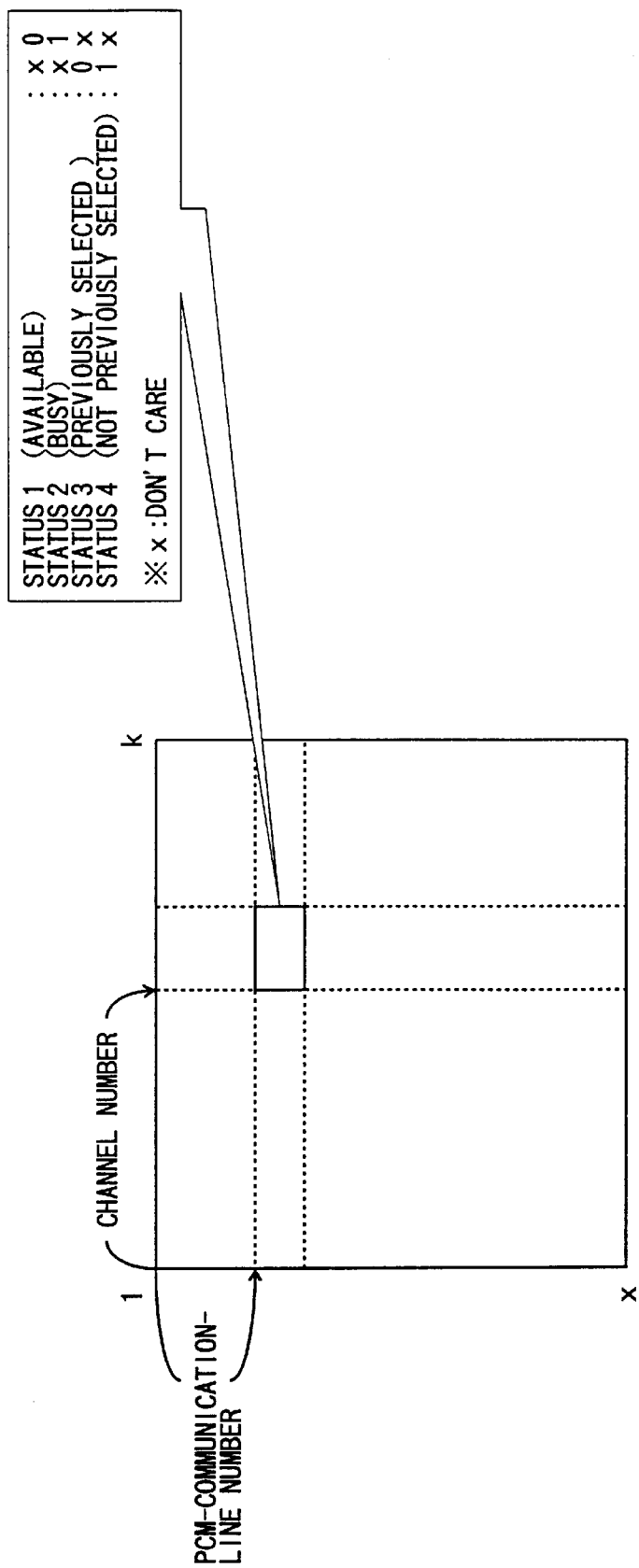
FIG. 5 is an illustrative drawing showing a channel-status-control table.

FIG. 5 is an illustrative drawing showing a channel-status-control table. This table includes table entries arranged in matrix having PCM-communication-line numbers 1 through X as rows and channel numbers 1 through 30 as columns. Here, the PCM-communication-line numbers 1 through X correspond to the PCM communication lines $40_1$ through $40_M$ and $42_N$ through $42_X$, respectively. Further, the channel numbers range from 1 to 30 because one PCM communication line has 30 channels in this example. Each of the table entries includes two bits, the lower bit indicating an available/busy status and the upper bit indicating whether the channel is a previously selected communication channel.

Figure 6:
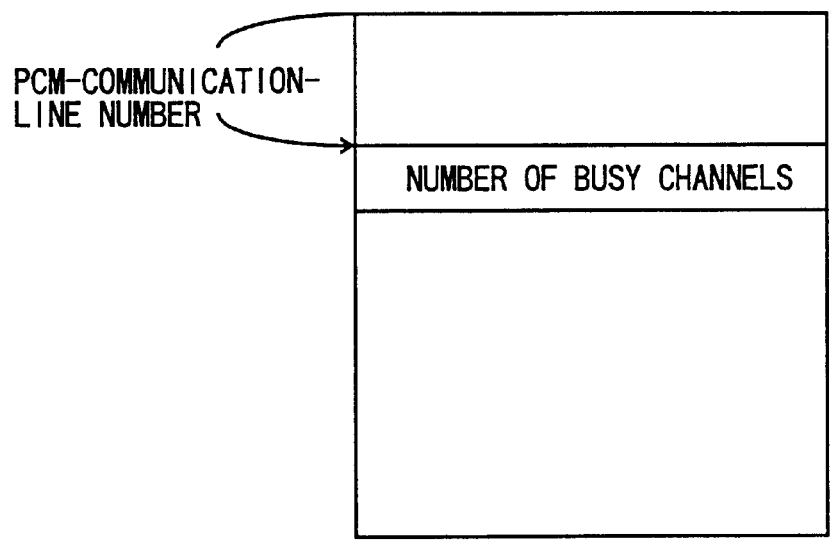
FIG. 6 is an illustrative drawing showing a busy-channel-count-control table.

FIG. 6 is an illustrative drawing showing a busy-channel-count-control table. This table includes the number of busy channels (i.e., channels engaged in ongoing communication) with respect to each of the PCM communication lines corresponding to the PCM-communication-line numbers 1 through X.

Figure 7:
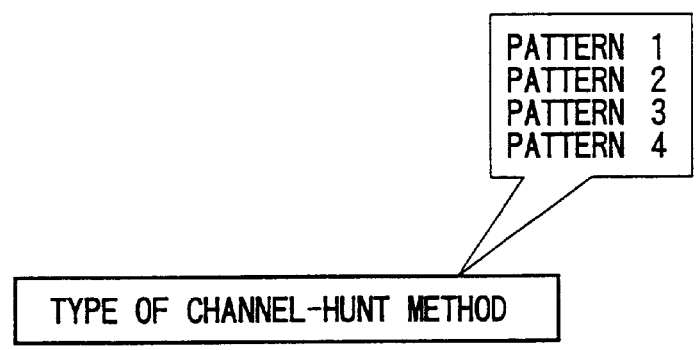
FIG. 7 is an illustrative drawing showing a pattern-control table.

FIG. 7 is an illustrative drawing showing a pattern-control table. This table includes a pattern indicator that indicates one of four different patterns corresponding to four different hunt methods.

Figure 8:
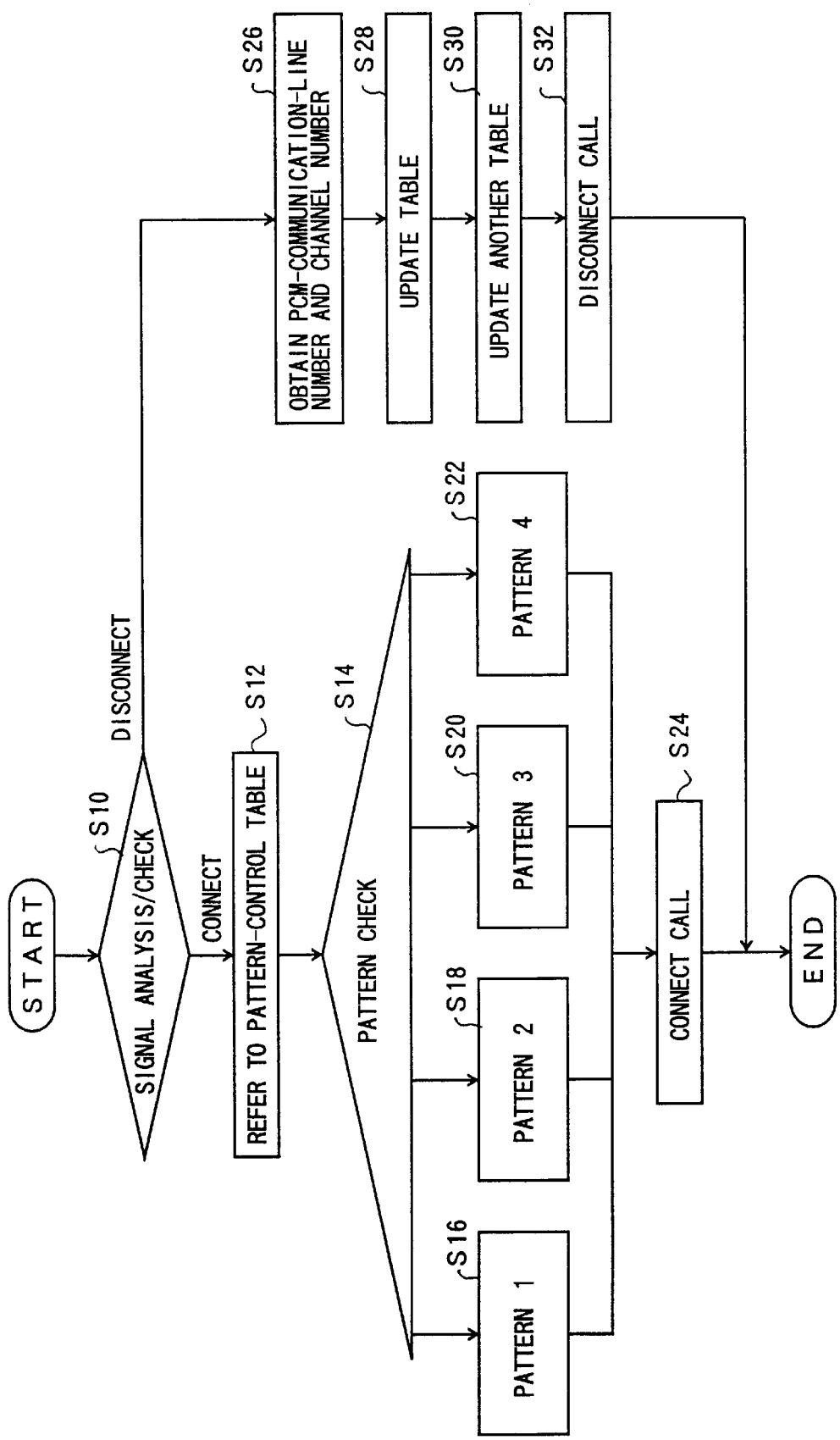
FIG. 8 is a flowchart of a process of hunting for a communication channel which is performed by a central control device of FIG. 4.

FIG. 8 is a flowchart of a process of hunting for a communication channel which is performed by the central control device 36.

The process of FIG. 8 is carried out when one of the subscriber terminals 34 connected to the switch 30 or one of the subscriber terminals 45 connected to the network access device 41 sends a call-transmission signal or a call-disconnection signal.

At a step S10, a received signal is analyzed. If the signal relates to call transmission, the procedure goes to a step S12.

At the step S12, the pattern-control table of FIG. 7 is consulted to look up a type of a channel hunt method.

At a step S14, a check is made as to which one of the patterns 1 through 4 corresponds to the type found in the pattern-control table. If the pattern 1 is selected, the procedure goes to a step S16 to attend to a communication-channel-hunt method of the pattern 1. If the pattern 2 is selected, the procedure goes to a step S18 to attend to a communication-channel-hunt method of the pattern 2. If the pattern 3 is selected, the procedure goes to a step S20 to attend to a communication-channel-hunt method of the pattern 3. If the pattern 4 is selected, the procedure goes to a step S22 to attend to a communication-channel-hunt method of the pattern 4. Thereafter, at a step S24, a call-connection process using the obtained communication channel is performed. This ends the procedure.

If the check at the step S10 finds that the received signal relates to call disconnection (i.e., call termination), the procedure goes to a step S26.

At the step S26, a PCM-communication-line number and a channel number are obtained from the communication channel to be disconnected.

At a step S28, a table entry corresponding to the PCM-communication-line number and the channel number obtained at the step S26 is searched for in the channel-status-control table of FIG. 5, and the table entry is updated by setting zero to the lower bit of the entry so as to indicate an available status of the channel.

At a step S30, the number of busy channels in the busy-channel-count-control table is accessed by using the PCM-communication-line number, and is decreased by one.

At a step S32, a call-disconnection process is performed. This ends the procedure.

Figure 9:
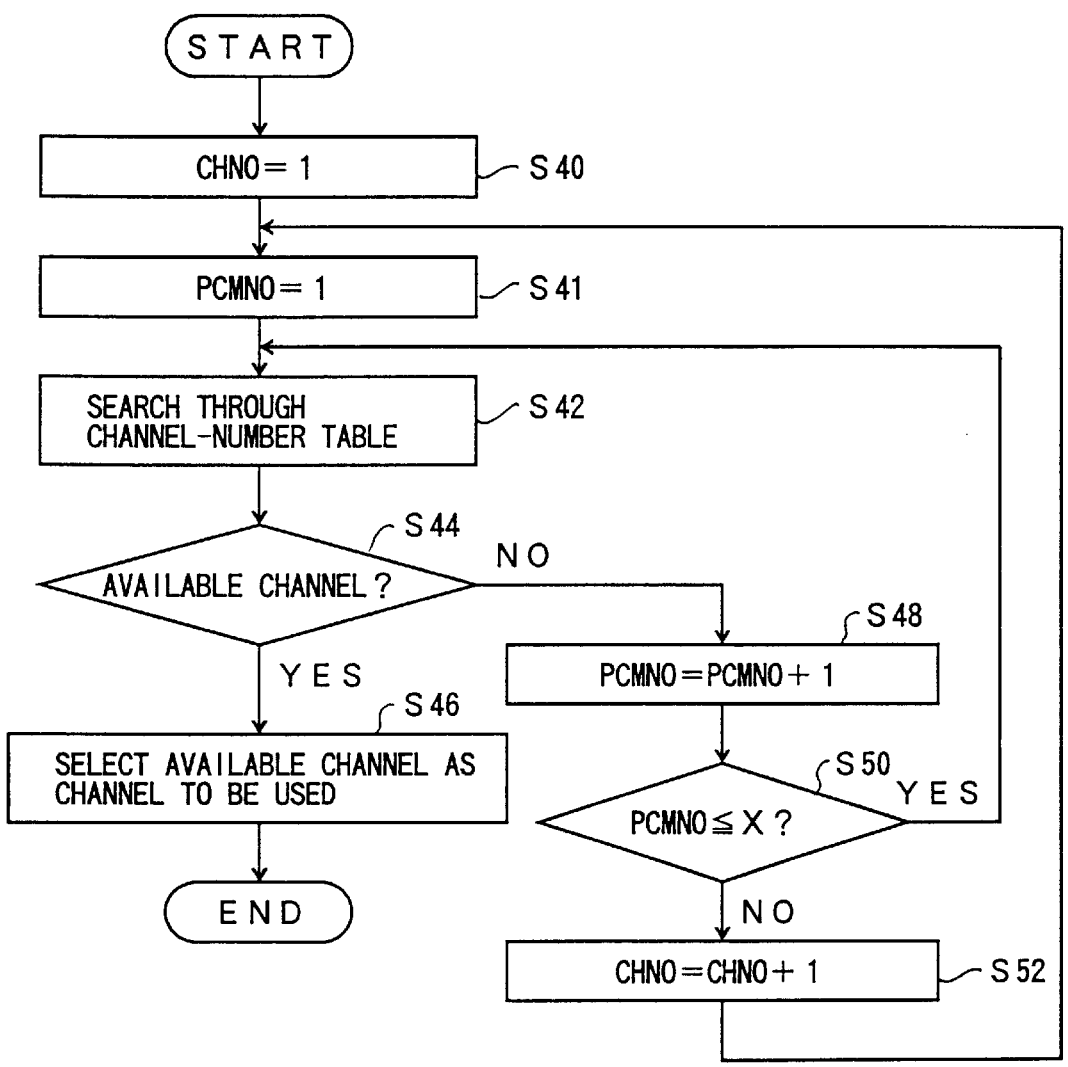
FIG. 9 is a flowchart of a communication-channel-hunt method of a first pattern according to the embodiment of the present invention.

FIG. 9 is a flowchart of a communication-channel-hunt method of the pattern 1 according to the embodiment of the present invention.

At a step S40, a channel number CHNO is set to 1.

At a step S41, a PCM-communication-line number PCMNO is set to 1.

At a step S42, a table entry is searched for in the channel-status-control table of FIG. 5 by using the channel number CHNO and the PCM-communication-line number PCMNO.

At a step S44, the table entry found at the step S42 is checked to find if the lower bit of the table entry is zero indicating an available status of the channel. If the channel is available, the procedure goes to a step S46.

At the step S46, the channel corresponding to the channel number CHNO and the PCM-communication-line number PCMNO is selected as a communication channel to be used. This ends the procedure.

If the check at the step S44 finds that the channel is not available, the procedure goes to a step S48.

At the step S48, the PCM-communication-line number PCMNO is increased by one.

At a step S50, a check is made as to whether the PCM-communication-line number PCMNO is no larger than the maximum number X of the channel-status-control table. If the PCM-communication-line number PCMNO is smaller than or equal to X, the procedure goes back to the step S42. If the PCM-communication-line number PCMNO is larger than X, the procedure goes to a step S52, at which the channel number CHNO is incremented by one. Then, the procedure goes back to the step S41.

In this method, a search for an available channel is made from the PCM-communication-line number 1 to the PCM-communication-line number X by checking if the channel of the channel number 1 is available. If an available channel is found, the channel is selected as a communication channel to be used. If no channel having the channel number 1 is available in any one of the PCM communication lines, a search for an available channel is made again from the PCM-communication-line number 1 to the PCM-communication-line number X by checking if the channel of the channel number 2 is available. A search is repeated by incrementing the channel number until an available channel is found. This type of search insures that the number of busy channels in a given PCM communication line tends to be close to one averaged out over the PCM communication lines.

Figure 10:
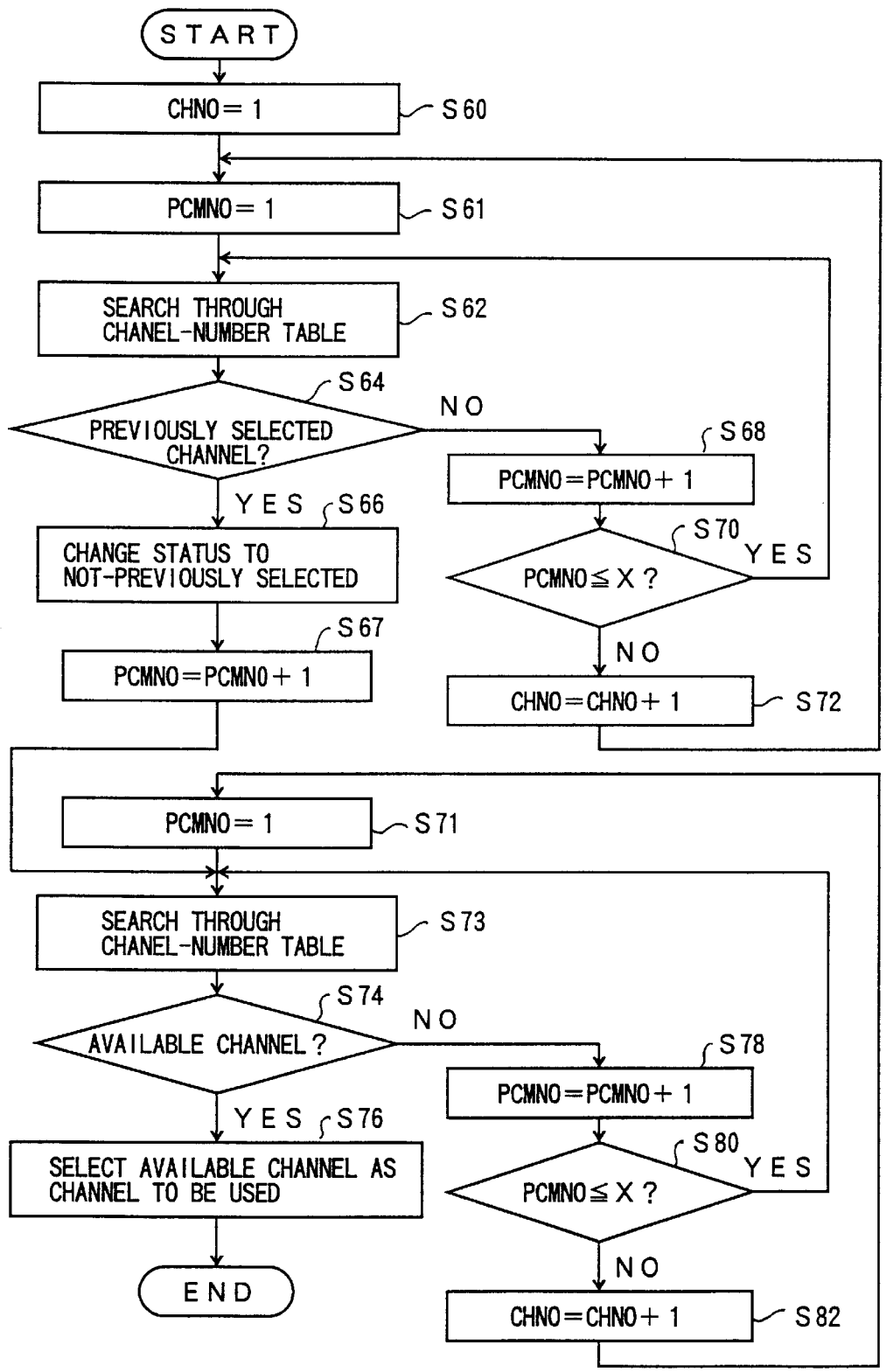
FIG. 10 is a flowchart of a communication-channel-hunt method of a second pattern according to the embodiment of the present invention.

FIG. 10 is a flowchart of a communication-channel-hunt method of the pattern 2 according to the embodiment of the present invention.

At a step S60, a channel number CHNO is set to 1.

At a step S61, a PCM-communication-line number PCMNO is set to 1.

At a step S62, a table entry is searched for in the channel-status-control table of FIG. 5 by using the channel number CHNO and the PCM-communication-line number PCMNO.

At a step S64, the table entry found at the step S62 is checked to find if the upper bit of the table entry is "1" indicating that the channel is a previously selected communication channel. If the channel is a previously selected communication channel, the procedure goes to a step S66.

At the step S66, the upper bit of the table entry is changed to zero to indicate that the channel is not a previously selected communication channel.

At a step S67, the PCM-communication-line number PCMN0 is incremented by one. Then, the procedure goes to a step S73.

If the step S64 finds that the channel is not a previously selected communication channel, the procedure goes to a step S68.

At the step S68, the PCM-communication-line number PCMNO is increased by one.

At a step S70, a check is made as to whether the PCM-communication-line number PCMNO is no larger than the maximum number X of the channel-status-control table. If the PCM-communication-line number PCMNO is smaller than or equal to X, the procedure goes back to the step S62. If the PCM-communication-line number PCMNO is larger than X, the procedure goes to a step S72, at which the channel number CHNO is incremented by one. Then, the procedure goes back to the step S61.

At the step S73 following the step S67, a table entry is searched for in the channel-status-control control table of FIG. 5 by using the channel number CHNO and the PCM-communication-line number PCMNO.

At a step S74, the table entry found at the step S73 is checked to find if the lower bit of the table entry is zero indicating an available status of the channel. If the channel is available, the procedure goes to a step S76.

At the step S76, the channel corresponding to the channel number CHNO and the PCM-communication-line number PCMNO is selected as a communication channel to be used. This ends the procedure.

If the check at the step S74 finds that the channel is not available, the procedure goes to a step S78.

At the step S78, the PCM-communication-line number PCMNO is increased by one.

At a step S80, a check is made as to whether the PCM-communication-line number PCMNO is no larger than the maximum number X of the channel-status-control table. If the PCM-communication-line number PCMNO is smaller than or equal to X, the procedure goes back to the step S73. If the PCM-communication-line number PCMNO is larger than X, the procedure goes to a step S82, at which the channel number CHNO is incremented by one. Then, the procedure goes to a step S71, at which the PCM-communication-line number PCMNO is set to 1. After this, the procedure goes to the step S73, and repeat the step S73 and the following steps.

In this method, a check is made from the PCM-communication-line number 1 to the PCM-communication-line number X as to whether the channel having the channel number 1 is a previously selected channel. If no channel having the channel number 1 is a previously selected channel in any one of the PCM communication lines, a check is made as to whether the channel having the channel number 2 is a previously selected channel where the check is made from the PCM-communication-line number 1 to the PCM-communication-line number X. When a previously selected communication channel is found, a check is made as to if there is an available channel in PCM communication lines following in number the PCM communication line having the previously selected communication channel. If no channel having the current channel number is available in any one of the PCM communication lines, a check is made with respect to the channel having the next following channel number where the check proceeds from the PCM-communication-line number 1 to the PCM-communication-line number X. This process continues until an available channel is found. When an available channel is found, it is selected as a communication channel to be used.

In this method, a search for an available channel is directed to channels following the previously selected communication channel in terms of PCM-communication-line numbers and channel numbers. Thus, the number of busy channels tends to be averaged over the PCM communication lines $40_1$ through $40_M$ and $42_N$ through $42_X$, and it is possible to avoid a situation where busy channels are mostly found among channels having relatively small channel numbers.

Figure 11:
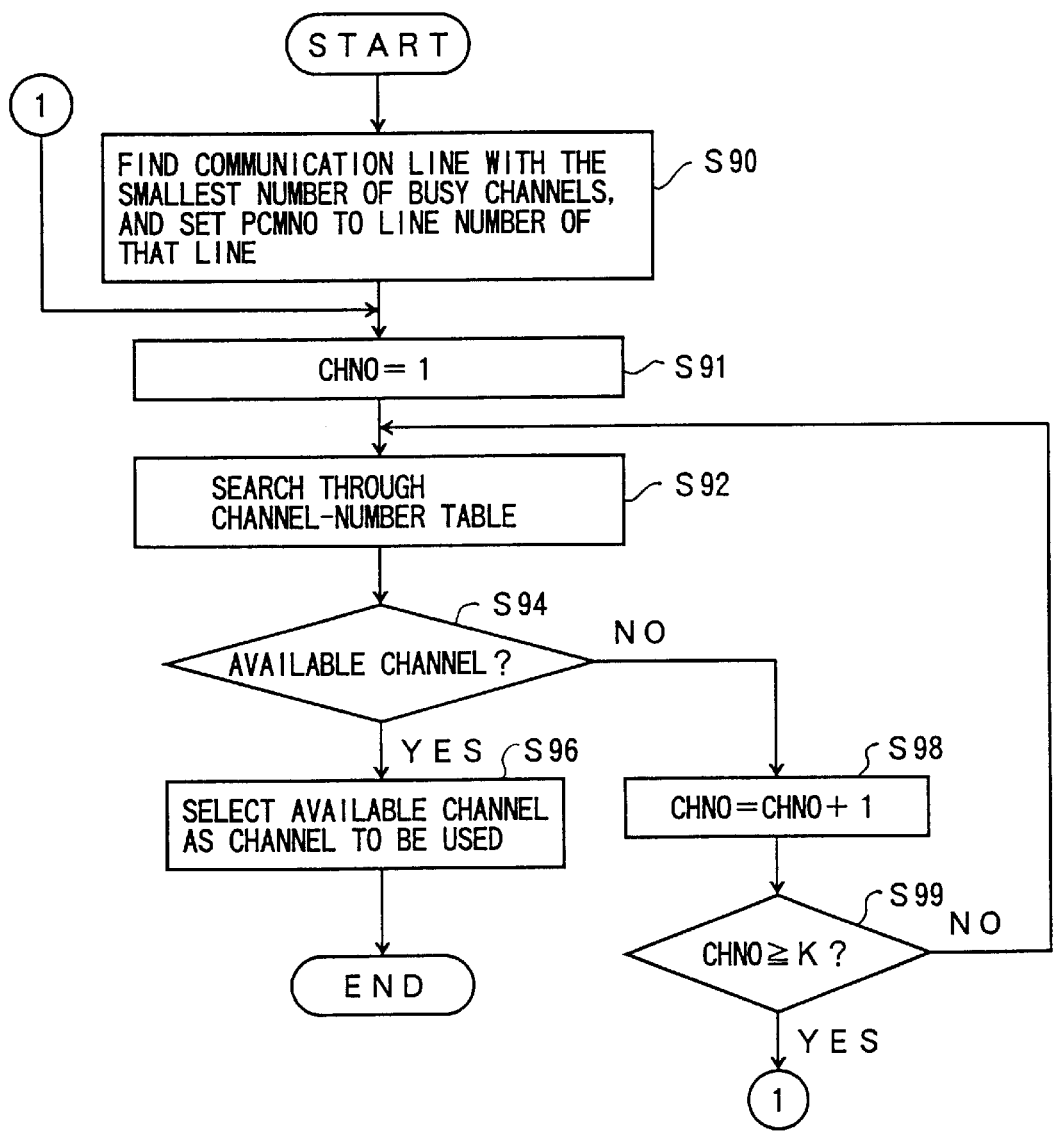
FIG. 11 is a flowchart of a communication-channel-hunt method of a third pattern according to the embodiment of the present invention.

FIG. 11 is a flowchart of a communication-channel-hunt method of the pattern 3 according to the embodiment of the present invention.

At a step S90, a PCM-communication-line number of a PCM communication line having the smallest number of busy channels is obtained by searching in the busy-channel-count-control table of FIG. 6, and is set in a PCM-communication-line number PCMNO.

At a step S91, a channel number CHNO is set to 1.

At a step S92, a table entry is searched for in the channel-status-control table of FIG. 5 by using the channel number CHNO and the PCM-communication-line number PCMNO.

At a step S94, the table entry found at the step S92 is checked to find if the lower bit of the table entry is zero indicating an available status of the channel. If the channel is available, the procedure goes to a step S96.

At the step S96, the channel corresponding to the channel number CHNO and the PCM-communication-line number PCMNO is selected as a communication channel to be used. This ends the procedure.

If the check at the step S94 finds that the channel is not available, the procedure goes to a step S98.

At the step S98, the channel number CHNO is increased by one.

At a step S99, a check is made as to whether the channel number CHNO is no smaller than the maximum number K (=30). If the channel number CHNO is larger than or equal to K, the procedure goes back to the step S91. If the channel number CHNO is smaller than K, the procedure goes back to the step S92.

In this method, a PCM communication line having the smallest number of busy channels is first selected from the PCM communication lines having the PCM-communication-line numbers 1 through X, and a search for an available channel is made from the channel number 1 and upwards. If an available channel is found, the channel is selected as a communication channel to be used. This type of search insures that the number of busy channels in a given PCM communication line tends to be close to one averaged out over the PCM communication lines.

Figure 12:
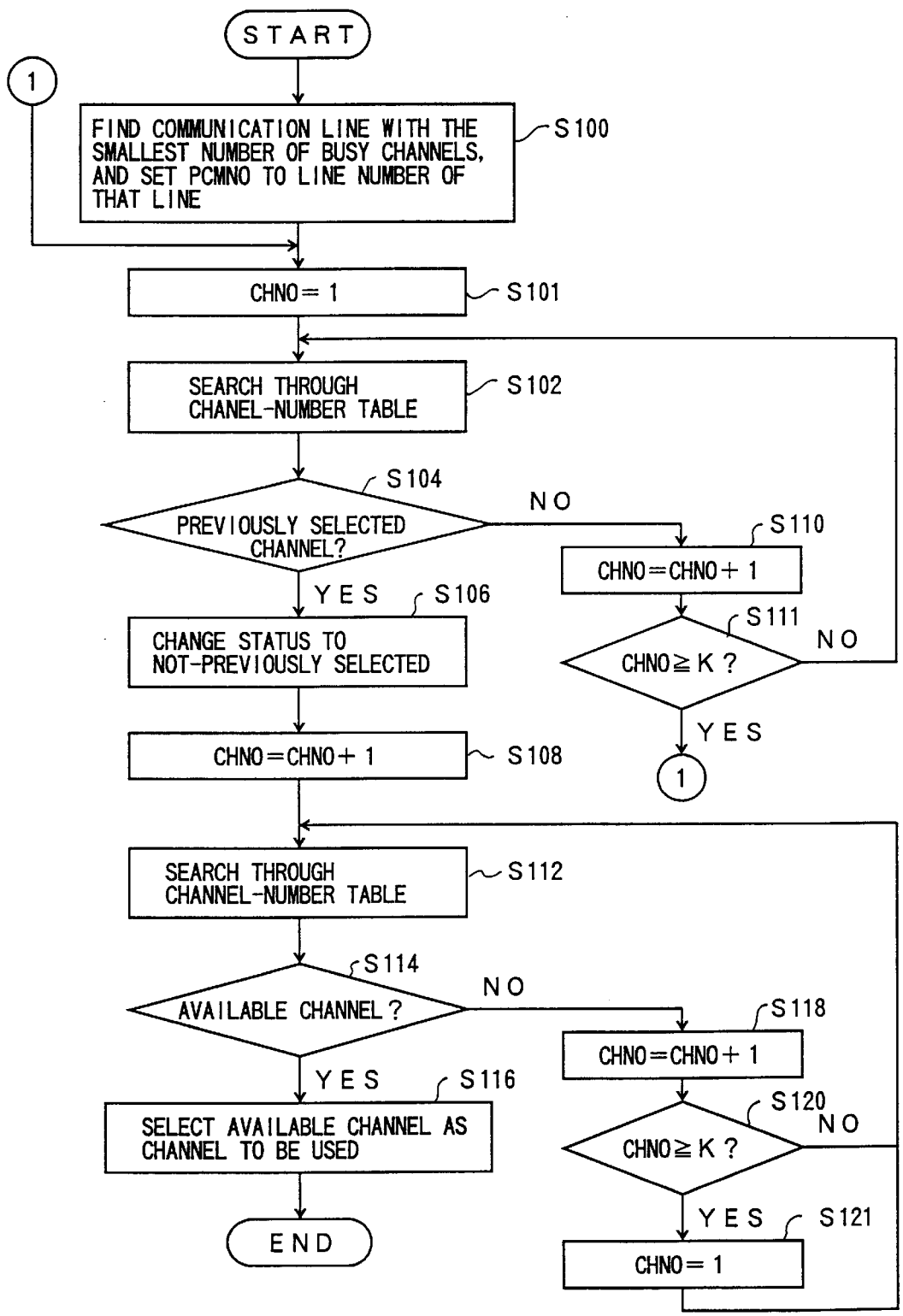
FIG. 12 is a flowchart of a communication-channel-hunt method of a fourth pattern according to the embodiment of the present invention.

FIG. 12 is a flowchart of a communication-channel-hunt method of the pattern 4 according to the embodiment of the present invention.

At a step S100, a PCM-communication-line number of a PCM communication line having the smallest number of busy channels is obtained by searching in the busy-channel-count-control table of FIG. 6, and is set in a PCM-communication-line number PCMNO.

At a step S101, a channel number CHNO is set to 1.

At a step S102, a table entry is searched for in the channel-status-control table of FIG. 5 by using the channel number CHNO and the PCM-communication-line number PCMNO.

At a step S104, the table entry found at the step S102 is checked to find if the upper bit of the table entry is "1" indicating that the channel is a previously selected communication channel. If the channel is a previously selected communication channel, the procedure goes to a step S106.

At the step S106, the upper bit of the table entry is changed to zero to indicate that the channel is not a previously selected communication channel.

At a step S108, the channel number CHNO is incremented by one. Then, the procedure goes to a step S112.

If the step S104 finds that the channel is not a previously selected communication channel, the procedure goes to a step S110.

At the step S110, the channel number CHNO is increased by one.

At a step S111, a check is made as to whether the channel number CHNO is no smaller than the maximum number K (K=30). If the channel number CHNO is larger than or equal to K, the procedure goes back to the step S101. If the channel number CHNO is smaller than K, the procedure goes back to the step S102.

At the step S112 following the step S108, a table entry is searched for in the channel-status-control table of FIG. 5 by using the channel number CHNO and the PCM-communication-line number PCMNO.

At a step S114, the table entry found at the step S112 is checked to find if the lower bit of the table entry is zero indicating an available status of the channel. If the channel is available, the procedure goes to a step S116.

At the step S116, the channel corresponding to the channel number CHNO and the PCM-communication-line number PCMNO is selected as a communication channel to be used. This ends the procedure.

If the check at the step S114 finds that the channel is not available, the procedure goes to a step S118.

At the step S118, the channel number CHNO is increased by one.

At a step S120, a check is made as to whether the channel number CHNO is no smaller than the maximum number K (K=30). If the channel number CHNO is larger than or equal to K, the procedure goes to a step S121, at which the channel number CHNO is set to 1, followed by going back to the step S112. If the channel number CHNO is smaller than K, the procedure goes back directly to the step S112.

In this method, a PCM communication line having the smallest number of busy channels is first selected from the PCM communication lines having the PCM-communication-line numbers 1 through X, and a search for a previously selected communication channel is made from the channel number 1 and upwards in the selected PCM communication line. If a previously selected communication channel is found, a search for an available channel is made in the selected PCM communication line by checking the channels following in number the previously selected communication channel. When an available channel is found, it is selected as a communication channel to be used.

In this method, a search for an available channel is directed to channels following the previously selected communication channel in the PCM communication line having the smallest number of busy channels, resulting in averaging out of the numbers of busy channels over the PCM communication lines $40_1$ through $40_M$ and $42_N$ through $42_X$. Further, the present invention makes it possible to avoid a situation where busy channels are found mostly among channels having relatively small channel numbers.

In this manner, the present invention avoids undesirable concentration of busy channels in a particular one of the PCM communication lines, and achieves even distribution of busy channels. The present invention thus can reduce the number of calls that are terminated at a time of PCM-communication-line failure, and, also, can reduce a time period required for closing a PCM communication line for the purpose of maintenance or the like.

Figure 13:
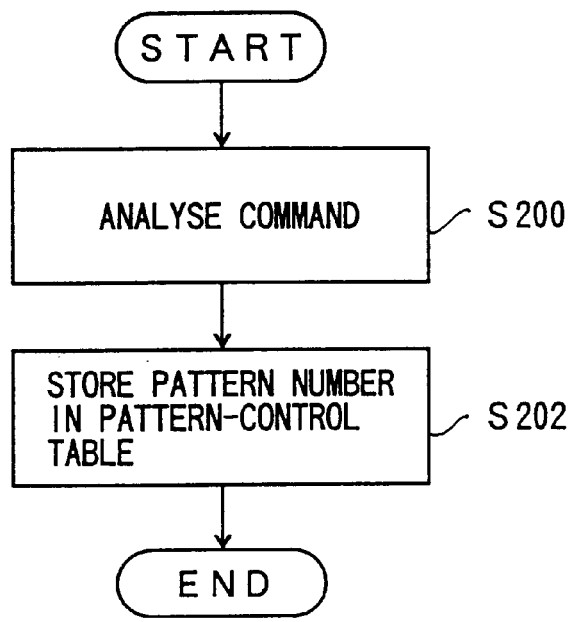
FIG. 13 is a flowchart of a process of changing a pattern that indicates a communication-channel-hunt method in the pattern-control table of FIG. 7.

FIG. 13 is a flowchart of a process of changing a pattern that indicates a communication-channel-hunt method in the pattern-control table. This process is performed by a maintenance worker who enters a command via the input/output device 39 to indicate one of the patterns 1 through 4.

At a step S200, the entered command is analyzed to identify an indicated pattern number.

At a step S202, the pattern number indicated by the entered command is stored in the pattern-control table of FIG. 7. This ends the procedure.

Use of the process described above makes it possible to select a desired communication-channel-hunt method.

As previously described, the process of FIG. 8, which includes therein the processes of FIG. 9 through FIG. 12, is performed by the central control device 36, which is a central processing unit. In this regard, the central control device 36 encompasses various means that perform particular functions required for implementing the present invention.

Further, the present invention is not limited to these embodiments, but various variations and modifications may be made without departing from the scope of the present invention.

The present application is based on Japanese priority application No. 11-177173 filed on Jun. 23, 1999, with the Japanese Patent Office, the entire contents of which are hereby incorporated by reference.

What is claimed is:

1. A method of hunting for a communication channel in a communication system where a plurality of communication lines each have a plurality of communication channels, comprising the steps of:
   a) maintaining a record of current channel statuses of the communication channels with respect to all the communication lines; and
   b) distributing busy channels evenly among the communication lines by selecting a communication channel based on the record of channel statuses and assigning the selected communication channel to a call.

2. The method as claimed in claim 1, wherein the communication channels have channel numbers assigned thereto, and the communication lines have line numbers assigned thereto, and wherein said step b) includes the steps of:
   b1) searching through the record for an available channel having a search channel number by checking the communication lines in an ascending order of the line numbers;
   b2) repeating said step b1) by successively incrementing the search channel number from a smallest channel number to a largest channel number until the available channel is found; and
   b3) assigning the available channel found by said step b2) to said call.

3. The method as claimed in claim 1, wherein the communication channels have channel numbers assigned thereto, and the communication lines have line numbers assigned thereto, and wherein said step b) includes the steps of:
   b1) searching through the record for a previously selected communication channel having a first search channel number by checking the communication lines in an ascending order of the line numbers;
   b2) repeating said step b1) by successively incrementing the first search channel number from a smallest channel number to a largest channel number until the previously selected communication channel is found;

b3) searching through the record for an available channel having a second search channel number by checking the communication lines in an ascending order of the line numbers by starting from a line number of the previously selected communication channel and going back from a largest line number to a smallest line number;

b4) repeating said step b3) by successively incrementing the second search channel number from a channel number of the previously selected communication channel found by said step b2) to the largest channel number until the available channel is found; and b5) assigning the available channel found by said step b4) to said call.

4. The method as claimed in claim 1, further comprising a step of maintaining a record of current numbers of busy channels with respect to all the communication lines, wherein said step b) includes the steps of:

b1) selecting a communication line having a smallest number of busy channels by referring to the record of current numbers of busy channels;

b2) searching through the record of current channel statuses for an available channel included in the selected communication line by checking the communication channels in a predetermined order; and b3) assigning the available channel found by said step b2) to said call.

5. The method as claimed in claim 1, further comprising a step of maintaining a record of current numbers of busy channels with respect to all the communication lines, wherein said step b) includes the steps of:

b1) selecting a communication line having a smallest number of busy channels by referring to the record of current numbers of busy channels;

b2) searching through the record of current channel statuses for a previously selected communication channel included in the selected communication line by checking the communication channels in a predetermined order;

b3) searching through the record of current channel statuses for an available channel included in the selected communication line by checking the communication channels in the predetermined order by starting from a communication channel next following the previously selected communication channel; and b4) assigning the available channel found by said step b4) to said call.

6. The device as claimed in claim 5, wherein the communication channels have channel numbers assigned thereto, and the communication lines have line numbers assigned thereto, and wherein said distributing means includes:

first means for searching through the record for an available channel having a search channel number by checking the communication lines in an ascending order of the line numbers;

second means repeating the search made by said first means by successively incrementing the search channel number from a smallest channel number to a largest channel number until the available channel is found; and third means for assigning the available channel found by said second means to said call.

7. A device for hunting for a communication channel in a communication system where a plurality of communication lines each have a plurality of communication channels, comprising:

table means for maintaining a record of current channel statuses of the communication channels with respect to all the communication lines; and distributing means for distributing busy channels evenly among the communication lines by selecting a communication channel based on the record of channel statuses and assigning the selected communication channel to a call.

8. The device as claimed in claim 7, wherein the communication channels have channel numbers assigned thereto, and the communication lines have line numbers assigned thereto, and wherein said distributing means includes:

first means for searching through the record for a previously selected communication channel having a first search channel number by checking the communication lines in an ascending order of the line numbers;

second means repeating the search made by said first means by successively incrementing the first search channel number from a smallest channel number to a largest channel number until the previously selected communication channel is found;

third means for searching through the record for an available channel having a second search channel number by checking the communication lines in an ascending order of the line numbers by starting from a line number of the previously selected communication channel and going back from a largest line number to a smallest line number;

fourth means for repeating the search made by said third means by successively incrementing the second search channel number from a channel number of the previously selected communication channel found by said second means to the largest channel number until the available channel is found; and fifth means for assigning the available channel found by said fourth means to said call.

9. The device as claimed in claim 7, further comprising a step of maintaining a record of current numbers of busy channels with respect to all the communication lines, wherein said distributing means includes:

first means for selecting a communication line having a smallest number of busy channels by referring to the record of current numbers of busy channels;

second means for searching through the record of current channel statuses for an available channel included in the selected communication line by checking the communication channels in a predetermined order; and third means for assigning the available channel found by said second means to said call.

10. The device as claimed in claim 7 further comprising means for maintaining a record of current numbers of busy channels with respect to all the communication lines, wherein said distributing means includes:

first means for selecting a communication line having a smallest number of busy channels by referring to the record of current numbers of busy channels;

second means for searching through the record of current channel statuses for a previously selected communication channel included in the selected communication line by checking the communication channels in a predetermined order;

third means for searching through the record of current channel statuses for an available channel included in the selected communication line by checking the communication channels in the predetermined order by starting from a communication channel next following the previously selected communication channel; and fourth means for assigning the available channel found by said third means to said call.

11. The device as claimed in claim 7, further comprising:

means for maintaining a record of current numbers of busy channels with respect to all the communication lines; and indicating means for indicating a search pattern, wherein said distributing means includes:

first means for searching through the record of current channel statuses for an available channel having a first search channel number by checking the communication lines in an ascending order of the line numbers, and for incrementing the first search channel number successively from a smallest channel number to a largest channel number until the available channel is found;

second means for searching through the record of current channel statuses for a previously selected communication channel having a second search channel number by checking the communication lines in an ascending order of the line numbers, for incrementing the second search channel number successively from the smallest channel number to the largest channel number until the previously selected communication channel is found, for searching through the record of current channel statuses for an available channel having a third search channel number by checking the communication lines in the ascending order of the line numbers by starting from a line number of the previously selected communication channel and going back from a largest line number to a smallest line number, and for incrementing the third search channel number successively from a channel number of the previously selected communication channel to the largest channel number until the available channel is found;

third means for selecting a communication line having a smallest number of busy channels by referring to the record of current numbers of busy channels, and for searching through the record of current channel statuses for an available channel included in the selected communication line by checking the communication channels in an ascending order of the channel numbers;

fourth means for selecting a communication line having a smallest number of busy channels by referring to the record of current numbers of busy channels, for searching through the record of current channel statuses for a previously selected communication channel included in the selected communication line by checking the communication channels in the ascending order of the channel numbers, and for searching through the record of current channel statuses for an available channel included in the selected communication line by checking the communication channels in the ascending order of the channel numbers by starting from a communication channel next following the previously selected communication channel; and fifth means for selecting one of said first means, said second means, said third means, and said fourth means such that the selected means performs a search corresponding to the search pattern indicated by said indicating means.

* * * * *